United States Patent
Chen et al.

(10) Patent No.: US 8,995,553 B2
(45) Date of Patent: Mar. 31, 2015

(54) METHODS AND APPARATUS FOR MITIGATING INTERFERENCE IN AGGRESSIVE FORM FACTOR DESIGNS

(71) Applicant: Apple Inc., Cupertino, CA (US)

(72) Inventors: Camille Chen, Cupertino, CA (US); David Cheung, Cupertino, CA (US); Hsin-Yao Chen, Cupertino, CA (US); Michael J. Giles, Cupertino, CA (US); Christopher B. Zimmermann, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/802,138

(22) Filed: Mar. 13, 2013

(65) Prior Publication Data

US 2013/0329821 A1 Dec. 12, 2013

Related U.S. Application Data

(60) Provisional application No. 61/657,633, filed on Jun. 8, 2012.

(51) Int. Cl.
*H04B 7/02* (2006.01)
*H04B 7/04* (2006.01)
*H04L 5/00* (2006.01)
*H04W 72/12* (2009.01)
(Continued)

(52) U.S. Cl.
CPC ............ *H04B 7/0413* (2013.01); *H04L 5/0064* (2013.01); *H04W 72/1215* (2013.01); *H04B 7/0691* (2013.01); *H04L 5/0023* (2013.01); *H04W 88/06* (2013.01)

USPC .......................................................... 375/267

(58) Field of Classification Search
CPC .. H04L 5/0064; H04L 5/0023; H04B 7/0413; H04B 7/0691; H04W 72/1215; H04W 88/06
USPC .......................................................... 375/267
See application file for complete search history.

(56) References Cited

U.S. PATENT DOCUMENTS 6,560,443 B1 * 5/2003 Vaisanen et al. ................. 455/73
6,646,505 B2 11/2003 Anderson (Continued)

FOREIGN PATENT DOCUMENTS

EP 1583295 A2 10/2005
EP 1605643 A1 12/2005

(Continued)

OTHER PUBLICATIONS

Wi-Fi(IEEE802.11) and Bluetooth Coexistence: Issues and Solutions, by Lior Ophir, Yegal Bitran, Italy Sherman, pp. 847-852, 0-7803-8523-3/04/ .Copyrgt.2004 IEEE.

(Continued)

*Primary Examiner* — Juan A Torres
(74) *Attorney, Agent, or Firm* — Gazdzinski & Associates, PC

(57) ABSTRACT

Methods and apparatus for mitigation of radio interference between two or more wireless concurrently operating interfaces in a wireless device having an aggressive form factor. In one embodiment, the interfaces are used for different tasks (e.g., WLAN for data and PAN for human interface devices), and the device includes logic configured to evaluate the priority of the tasks and adjust the operation of one or more of the interfaces accordingly.

18 Claims, 8 Drawing Sheets

(51) Int. Cl.
*H04B 7/06* (2006.01)
*H04W 88/06* (2009.01)

(56) References Cited

U.S. PATENT DOCUMENTS

| | | | |
|---|---|---|---|
| 6,774,864 B2 | 8/2004 | Evans et al. | |
| 6,978,121 B1* | 12/2005 | Lane et al. | 455/73 |
| 7,142,864 B2 | 11/2006 | Laroia et al. | |
| 7,146,133 B2 | 12/2006 | Bahl et al. | |
| 7,181,182 B2 | 2/2007 | Cha et al. | |
| 7,200,376 B2 | 4/2007 | Cha et al. | |
| 7,224,704 B2 | 5/2007 | Lu et al. | |
| 7,253,783 B2 | 8/2007 | Chiang et al. | |
| 7,295,860 B2 | 11/2007 | Suwa | |
| 7,301,924 B1 | 11/2007 | Gurbuz et al. | |
| 7,352,332 B1 | 4/2008 | Betts-LaCroix et al. | |
| 7,352,688 B1 | 4/2008 | Peralha et al. | |
| 7,359,730 B2 | 4/2008 | Dennis et al. | |
| 7,362,275 B2 | 4/2008 | Tu et al. | |
| 7,366,244 B2 | 4/2008 | Gebara et al. | |
| 7,444,119 B2 | 10/2008 | Bekritsky | |
| 7,505,790 B2 | 3/2009 | Chang et al. | |
| 7,546,142 B2 | 6/2009 | Ginzburg et al. | |
| 7,561,904 B2 | 7/2009 | Lagnado | |
| 7,574,179 B2 | 8/2009 | Barak et al. | |
| 7,606,553 B2 | 10/2009 | Konaka | |
| 7,640,373 B2 | 12/2009 | Cudak et al. | |
| 7,657,411 B2 | 2/2010 | Poetsch et al. | |
| 7,701,913 B2 | 4/2010 | Chen et al. | |
| 7,760,679 B2 | 7/2010 | Baker et al. | |
| 7,813,295 B2 | 10/2010 | Trachewsky | |
| 7,813,314 B2 | 10/2010 | Fulknier et al. | |
| 7,949,364 B2 | 5/2011 | Kasslin et al. | |
| 8,072,914 B2 | 12/2011 | Brisebois et al. | |
| 8,121,072 B2 | 2/2012 | Awad et al. | |
| 8,200,161 B2 | 6/2012 | Walley et al. | |
| 8,265,017 B2 | 9/2012 | Robinson et al. | |
| 8,270,500 B2 | 9/2012 | Tidestay | |
| 8,284,721 B2 | 10/2012 | Chen et al. | |
| 8,284,725 B2 | 10/2012 | Ahmadi | |
| 8,340,578 B2 | 12/2012 | Tolentino et al. | |
| 8,379,548 B1* | 2/2013 | Husted | 370/297 |
| 8,396,003 B2 | 3/2013 | Leinonen et al. | |
| 8,594,049 B2 | 11/2013 | Ohta | |
| 8,599,709 B2 | 12/2013 | Chen et al. | |
| 8,665,781 B2 | 3/2014 | Awad et al. | |
| 8,787,288 B2 | 7/2014 | Shi et al. | |
| 2002/0136184 A1* | 9/2002 | Liang et al. | 370/338 |
| 2002/0173272 A1 | 11/2002 | Liang et al. | |
| 2004/0192222 A1* | 9/2004 | Vaisanen et al. | 455/78 |
| 2004/0259589 A1* | 12/2004 | Bahl et al. | 455/553.1 |
| 2005/0141895 A1 | 6/2005 | Ruiz | |
| 2005/0170776 A1 | 8/2005 | Siorpaes | |
| 2005/0208900 A1* | 9/2005 | Karacaoglu | 455/78 |
| 2005/0215197 A1* | 9/2005 | Chen et al. | 455/41.2 |
| 2005/0239497 A1 | 10/2005 | Bahl et al. | |
| 2005/0276241 A1* | 12/2005 | Kamerman et al. | 370/328 |
| 2006/0005058 A1 | 1/2006 | Chen et al. | |
| 2006/0030265 A1* | 2/2006 | Desai et al. | 455/41.2 |
| 2006/0030266 A1* | 2/2006 | Desai et al. | 455/41.2 |
| 2006/0030278 A1* | 2/2006 | Konaka | 455/78 |
| 2006/0034217 A1 | 2/2006 | Kwon et al. | |
| 2006/0035653 A1 | 2/2006 | Karaoguz et al. | |
| 2006/0084383 A1* | 4/2006 | Ibrahim et al. | 455/41.2 |
| 2006/0094364 A1* | 5/2006 | Hirota et al. | 455/66.1 |
| 2006/0133259 A1 | 6/2006 | Lin et al. | |
| 2006/0133334 A1 | 6/2006 | Ross | |
| 2006/0209763 A1 | 9/2006 | Emeott et al. | |
| 2006/0223450 A1 | 10/2006 | Dacosta et al. | |
| 2006/0274704 A1* | 12/2006 | Desai et al. | 370/338 |
| 2006/0292986 A1* | 12/2006 | Bitran et al. | 455/41.2 |
| 2006/0292987 A1* | 12/2006 | Ophir et al. | 455/41.2 |
| 2007/0060055 A1* | 3/2007 | Desai et al. | 455/41.2 |
| 2007/0066227 A1* | 3/2007 | Duerdodt et al. | 455/63.1 |
| 2007/0076649 A1 | 4/2007 | Lin et al. | |
| 2007/0099567 A1* | 5/2007 | Chen et al. | 455/41.2 |
| 2007/0109973 A1* | 5/2007 | Trachewsky | 370/252 |
| 2007/0161352 A1 | 7/2007 | Dobrowski et al. | |
| 2007/0224936 A1* | 9/2007 | Desai | 455/41.2 |
| 2007/0232358 A1* | 10/2007 | Sherman | 455/560 |
| 2007/0238483 A1* | 10/2007 | Boireau et al. | 455/553.1 |
| 2008/0026718 A1 | 1/2008 | Wangard et al. | |
| 2008/0069063 A1 | 3/2008 | Li et al. | |
| 2008/0080455 A1* | 4/2008 | Rofougaran | 370/342 |
| 2008/0089690 A1 | 4/2008 | Ruiz | |
| 2008/0095263 A1 | 4/2008 | Xu et al. | |
| 2008/0108394 A1 | 5/2008 | Davis et al. | |
| 2008/0125047 A1 | 5/2008 | Li et al. | |
| 2008/0130603 A1* | 6/2008 | Wentink et al. | 370/338 |
| 2008/0192806 A1* | 8/2008 | Wyper et al. | 375/133 |
| 2008/0200124 A1* | 8/2008 | Capretta et al. | 455/41.3 |
| 2008/0259846 A1* | 10/2008 | Gonikberg et al. | 370/328 |
| 2008/0279138 A1* | 11/2008 | Gonikberg et al. | 370/328 |
| 2008/0279162 A1* | 11/2008 | Desai | 370/338 |
| 2008/0279163 A1* | 11/2008 | Desai | 370/338 |
| 2009/0081962 A1* | 3/2009 | Sohrabi | 455/79 |
| 2009/0137206 A1* | 5/2009 | Sherman et al. | 455/41.2 |
| 2009/0147763 A1* | 6/2009 | Desai et al. | 370/343 |
| 2009/0176454 A1* | 7/2009 | Chen et al. | 455/63.1 |
| 2009/0257379 A1* | 10/2009 | Robinson et al. | 370/329 |
| 2009/0285167 A1 | 11/2009 | Hirsch et al. | |
| 2009/0323652 A1* | 12/2009 | Chen et al. | 370/338 |
| 2010/0034381 A1 | 2/2010 | Trace et al. | |
| 2010/0113090 A1 | 5/2010 | Lin et al. | |
| 2010/0153395 A1 | 6/2010 | Hannuksela et al. | |
| 2010/0254335 A1 | 10/2010 | Koo et al. | |
| 2010/0273426 A1* | 10/2010 | Walley et al. | 455/63.1 |
| 2010/0316027 A1* | 12/2010 | Rick et al. | 370/336 |
| 2010/0322222 A1* | 12/2010 | Desai | 370/338 |
| 2011/0019561 A1 | 1/2011 | Yun et al. | |
| 2011/0081858 A1* | 4/2011 | Tolentino et al. | 455/41.2 |
| 2011/0090982 A1* | 4/2011 | Chen et al. | 375/285 |
| 2013/0143949 A1 | 6/2013 | Chen et al. | |
| 2013/0260821 A1* | 10/2013 | Deparis et al. | 455/553.1 |

FOREIGN PATENT DOCUMENTS

| | | |
|---|---|---|
| EP | 1 626 541 A2 | 2/2006 |
| EP | 1 653 672 | 5/2006 |
| EP | 1 838 040 | 9/2007 |
| EP | 1 906 555 | 4/2008 |
| EP | 2244509 | 10/2010 |
| JP | 2004032462 | 1/2004 |
| WO | WO 2006/090242 A1 | 8/2006 |
| WO | WO 2008001272 | 1/2008 |
| WO | WO 2008/034038 | 3/2008 |
| WO | WO 2008041071 | 4/2008 |
| WO | WO 2009/055714 | 4/2009 |
| WO | WO 2011/028481 A2 | 3/2011 |
| WO | WO 2011/123550 A1 | 10/2011 |

OTHER PUBLICATIONS

Coexistence Mechanisms for Interference Mitigation Between IEEE 802.11 WLANS and Bluetooth, by Carla F. Chiasserini and Ramesh R. Rao, IEEE Infocom 2002, pp. 590-598, 0-7-803-7476-2/02/ .Copyrgt.2002 IEEE.
Bluetooth Core Specification v2.1 + EDR, dated Jul. 26, 2007.
Bluetooth Advanced Audio Distribution Profile 1.2, dated Apr. 16, 2007.
Bluetooth Audio/Video Remote Control Profile 1.3, dated Apr. 16, 2007.
Bluetooth Basic Imaging Profile (BIP), dated Jul. 25, 2003.
Bluetooth Basic Printing Profile (BPP) 1.2, dated Apr. 27, 2006.
Bluetooth Cordless Telephony Profile (CTP), dated Feb. 22, 2001.
Bluetooth Device Identification Profile (DI) 1.3, dated Jul. 26, 2007.

* cited by examiner

| | D2 P1B2B | | | |
|---|---|---|---|---|
| | IN ROOM | MEDIUM RANGE | LONG RANGE | COMMENT |
| Wi-Fi + BT MOUSE + BT KEYBOARD + BT HEADSET (SCO) | | | | |
| FACETIME + WEB BROWSING | PASS | PASS | PASS | |
| AIRTUNES STREAM + WEB BROWSING | PASS | PASS | PASS | |
| TIME MACHINE BACKUP + AIR TUNES STREAM + WEB BROWSING | PASS | SOMEWHAT | SOMEWHAT | TM BACKUPS SLOW/RATE AUDIO BUFFER AT LONG RANGE |
| YOUTUBE STREAM + WEB BROWSING | PASS | PASS | PASS | |
| Wi-Fi + BT MOUSE + BT KEYBOARD + BT HEADPHONES (A2DP) | | | | |
| WEB BROWSING | PASS | PASS | PASS | |
| ITUNES MUSIC SHARING + WEB BROWSING | PASS | PASS | PASS | |
| TIME MACHINE BACKUP + ITUNES MUSIC SHARING + WEB BROWSING | PASS | PASS | SOMEWHAT | SLOW TM BACKUP, MINOR AUDIO HICCUP |
| YOUTUBE STREAM + WEB BROWSING | PASS | PASS | PASS | |

FIG. 8

METHODS AND APPARATUS FOR MITIGATING INTERFERENCE IN AGGRESSIVE FORM FACTOR DESIGNS

PRIORITY AND RELATED APPLICATIONS

This application claims priority to U.S. Provisional Patent Application Ser. No. 61/657,633, entitled "METHODS AND APPARATUS FOR MITIGATING INTERFERENCE IN AGGRESSIVE FORM FACTOR DESIGNS", filed Jun. 8, 2012, which is incorporated by reference herein in its entirety.

This application is related to co-pending U.S. patent application Ser. No. 13/025,059 filed Feb. 10, 2011 and entitled "METHODS AND APPARATUS FOR WIRELESS COEXISTENCE BASED ON TRANSCEIVER CHAIN EMPHASIS", and U.S. patent application Ser. No. 13/312,894 filed Dec. 6, 2011 and entitled "METHODS AND APPARATUS FOR WIRELESS OPTIMIZATION BASED ON PLATFORM CONFIGURATION AND USE CASES", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of interference mitigation within wireless networks. More particularly, in one exemplary embodiment, the present disclosure is directed to mitigating interference between multiple radio interfaces in aggressive form factor designs.

2. Description of Related Technology

The growing market for so-called "convergence products" has led to a revolution in the way consumers view computerized devices. These next generation computerized devices focus on offering consumers a substantially unified solution for a variety of services to which consumers have become accustomed. Common examples of such convergence products include, but are not limited to laptop computers, smart phones, and tablet computers such as the exemplary iMac™, Mac-Mini™, Apple TV™, Mac Pro™, Macbook™, Macbook Pro™, Macbook Air™, iPhone™, and iPad™ manufactured by the Assignee hereof. Convergence products must generally support a variety of wireless protocols and other functions. For instance, a convergence smart phone such as the iPhone has the capability of, among other things, sending and receiving emails over a Wireless Local Area Network (WLAN) such as e.g., the IEEE 802.11a/b/g/n standards, making and receiving voice/data calls using a cellular network (e.g., Global System for Mobile Communications (GSM), Universal Mobile Telecommunications System (UMTS), LTE or LTE-A, etc.) and operating wireless peripheral equipment (such as wireless headsets, keyboards, etc.) using a personal area network (PAN) (e.g., Bluetooth™ protocol (BT), etc.) and providing location services (e.g., via Global Positioning System (GPS)).

Within this context, aggressive form factor designs and new design paradigms have greatly altered the landscape of consumer electronics. Consumers demand design qualities that transcend functionality; certain qualities such as reduced size, aesthetic appeal, portability, shared resources (e.g., multi-purposed components), and battery life have taken precedence over traditional design criteria. For example, metallic construction is often highly desired; however, those of ordinary skill will recognize that metallic materials can shield and/or interfere with radio reception. Similarly, compressing multiple radio transceivers within aggressively compact form factors contributes significantly to overall platform noise and may create other co-existence issues. Moreover, consumer electronics must provide higher performance over legacy platforms to satisfy evolving user expectations.

As devices have evolved according to customer preferences, certain design tradeoffs have adversely affected performance. Lower performance can potentially result in a poor user experience with the device. For example, certain aggressive form factors implement both BT and WLAN transceivers/antennae within very close physical proximity to one another. Unfortunately, BT and WLAN share the same ISM (Industrial Scientific Medical) radio band; i.e., 2.4-2.48 GHz frequency range. Consequently, BT and WLAN technologies will often interfere with each other when operating simultaneously, which causes noticeable problems in the user interface (e.g., BT audio stutter and drop-outs, slow WLAN transfer speeds, poor BT mouse tracking, keyboard and touchpad performance, or "jerkiness", etc.) and in very severe conditions, can result in link failures.

Current and future consumer electronics device manufacturers must re-evaluate existing design assumptions. Future designs will need to establish new schemes for handling aggressive form factor designs and new design paradigms. In particular, new constraints (such as size and layout, manufacturing and design cost, product schedules, etc.) must be balanced against demands for high performance processors, memories, interfaces, system buses, display elements, and high rate clocking, etc. Realistically, future devices will have to tolerate higher platform noise (e.g., both static and dynamic noise floors (NF)) while still delivering acceptable performance and user experience.

Accordingly, improved solutions are needed for mitigating interference between multiple radio interfaces in, e.g., aggressive form factor designs.

SUMMARY

The present disclosure provides, inter alfa, improved apparatus and methods for mitigating interference between multiple radio interfaces in aggressive form factor designs.

In one respect, a wireless-enabled user device is disclosed. The device includes a plurality of wireless interfaces, where one or more of the wireless interfaces that are configured to negotiate with one another to determine the highest priority wireless interface. In one exemplary variant, a bus interface enables one or more data transfer protocols between e.g., a wireless local area network (WLAN) baseband and a Bluetooth (BT) baseband.

In another embodiment of the device, the physical isolation characteristics of the antennas of the wireless device are leveraged to optimize the physical design of the device. Specifically, in one embodiment, during initial design analysis, WLAN/BT antenna isolation is measured in both a so-called "open lid mode" (i.e., where the wireless device has been opened for operation) and a so-called "clamshell mode" (i.e., where the wireless device is closed). Those of ordinary skill in the related arts will readily appreciate that the physical configuration does not necessarily limit operation. For example, in open lid mode the user can use the built-in keyboard, mouse and touchpad, whereas during the clamshell mode the user may use an external display, mouse, and keyboard (i.e., the device is closed but still operating). Different coexistence schemes may be used for different physical and/or operational configurations.

A non-transitory computer readable apparatus is also disclosed. The apparatus includes one or more instructions that are configured to, when executed, cause a processor to: control first and second wireless interface (e.g., WLAN and BT) transmit power. In one exemplary variant, the WLAN (processor) can adjust one or more WLAN transmit power according to a tuple (such as a triplet) corresponding to different antennas of a multiple-input-multiple-output (MIMO) array. The WLAN baseband can additionally instruct the BT baseband to boost transmit power to e.g., prioritize BT traffic, improve BT performance, etc.

In another embodiment, the instructions are configured to limit certain transactions to particular resources. For example, in one such variant, the WLAN processor can allocate a particular antenna for a specified task and/or message; e.g., the WLAN baseband can dedicate an antenna for only transmitting high priority signals.

In yet another aspect, an exemplary wireless device is configured with logic that selectively turns off one or more radio or transmit/receive channel components (or otherwise adjusts their use/behavior) based on e.g., the level of interference.

Methods of minimizing co-existence interference in a wireless device with aggressive form factor are also disclosed.

In yet a further aspect, methods of enhancing WLAN data throughput without significantly impacting user experience are disclosed.

A wireless enabled user device is further disclosed. In one embodiment, the wireless enabled user device includes: a first wireless interface operative in a first frequency band; a second wireless interface disposed proximate the first interface within the device and operative in a substantially overlapping frequency band with the first frequency band; and logic in communication with at least one of the first and second interfaces. In one such example, the logic is configured to: determine at least one priority of concurrent first and second tasks to be performed by the first and second interfaces, respectively; and adjust operation of at least one of the interfaces based on the at least one determined priority so as to achieve at least one of: (i) mitigated radio interference; and/or (ii) enhanced data throughput.

In one variant, the adjustment of the operation is based at least in part on a first priority associated with the first wireless interface. For example, the first priority may be determined for the first wireless interface in response to a query from the first wireless interface.

In other variants, the adjustment of the operation includes a first assignment of one or more first antennas to the first interface for completion of the first task.

In still other variants, the adjustment of the operation further includes a second assignment of at least one second antenna to the second interface for completion of the second task, where the first and second antennas have a known isolation.

In some implementations, the adjustment of operation includes a delay in completion of the first task.

In certain cases, the determined at least one priority is based on a static priority scheme. In other cases, the determined at least one priority is based at least in part on user input.

Still further, the determined at least one priority may include a first priority level associated with the first task and a second priority level associated with the second task. In some cases, the user device may include logic configured to reserve at least one antenna for the first task assigned to the first priority level. Still other implementations may include where the first priority level is associated with human interface device (HID) operation and the second priority level is associated with internet protocol (IP) activity, the first priority level being greater than the second priority level.

A wireless interface is also disclosed. In one embodiment, the wireless interface includes: a transmission device; and processing logic in operative communication with the transmission device, the processing logic configured to run one or more computer programs thereon. In one exemplary embodiment, the one or more computer programs include a plurality of instructions configured to, when executed, cause the wireless interface to: query a priority logic, the priority logic configured to select a priority scheme associated with execution of one or more tasks by the wireless interface; and based at least in part on the selected priority scheme, adjust one or more operational parameters used in the execution of the one or more tasks; where the priority scheme is selected to optimize data throughput of the wireless interface and at least one other wireless interface with overlapping spectral usage.

In one variant, the adjustment of the one or more operational parameters includes adjustment of a transmit power of the transmission device.

In other variants, the transmission device includes a multiple-input multiple-output (MIMO) antenna array, and the adjustment of the transmit power is based on a tuple of the MIMO antenna array.

In some implementations, the transmission device includes a plurality of components; and the adjustment of the one or more operational parameters includes deactivation of at least one of the plurality of components during execution of the one or more tasks.

A method of managing interference during operation of at least two wireless interfaces with overlapping spectral usage is further disclosed. In one embodiment, the method includes: determining a plurality of priorities corresponding to a plurality of tasks that are scheduled to be simultaneously executed, the plurality of tasks being associated with respective ones of the at least two wireless interfaces; and based on the determined plurality of priorities, altering the execution of at least one of the plurality of tasks; wherein the altered execution reduces a resource interference for the at least two wireless interfaces with overlapping spectral usage.

In some variants, the determining of at least a first priority includes polling a baseband processor for the priority.

In other variants, the altered execution includes adjusting a transmit power associated with the at least one of the plurality of tasks.

A non-transitory computer-readable apparatus configured to store at least one computer program thereon is also disclosed. In one embodiment, the computer program includes a plurality of instructions configured to, when executed cause a device to: identify a plurality of operations to be performed by at least a first and a second wireless interfaces via at least a first and a second resources, respectively; determine a priority scheme for the plurality of operations; and based at least in part on the priority scheme, manage the first and second resources, where the first and second resources interfere when operated concurrently; where the priority scheme is configured to avoid a concurrent use.

A wireless communication system is additionally disclosed. In one embodiment, the wireless communication system includes: a first wireless communication device configured to operate using a first protocol; a second wireless communication device configured to operate using a second protocol, the first and second protocols using overlapping spectral resources; and priority logic configured to manage a plurality of concurrent operations on respective ones of the first and second wireless communication devices; where the first wireless device is configured to, based at least on the priority logic, adjust one or more transmission and/or reception parameters so as to reduce interference among the plurality of concurrent operations.

Other features and advantages will immediately be recognized by persons of ordinary skill in the art with reference to the attached drawings and detailed description of exemplary embodiments as given below.

BRIEF DESCRIPTION OF THE DRAWINGS

FIG. 8 is a table of WLAN/BT client device (of FIG. 5) performance for a set of common user tasks during concurrent operation of both WLAN and BT interfaces.

Figure 1:
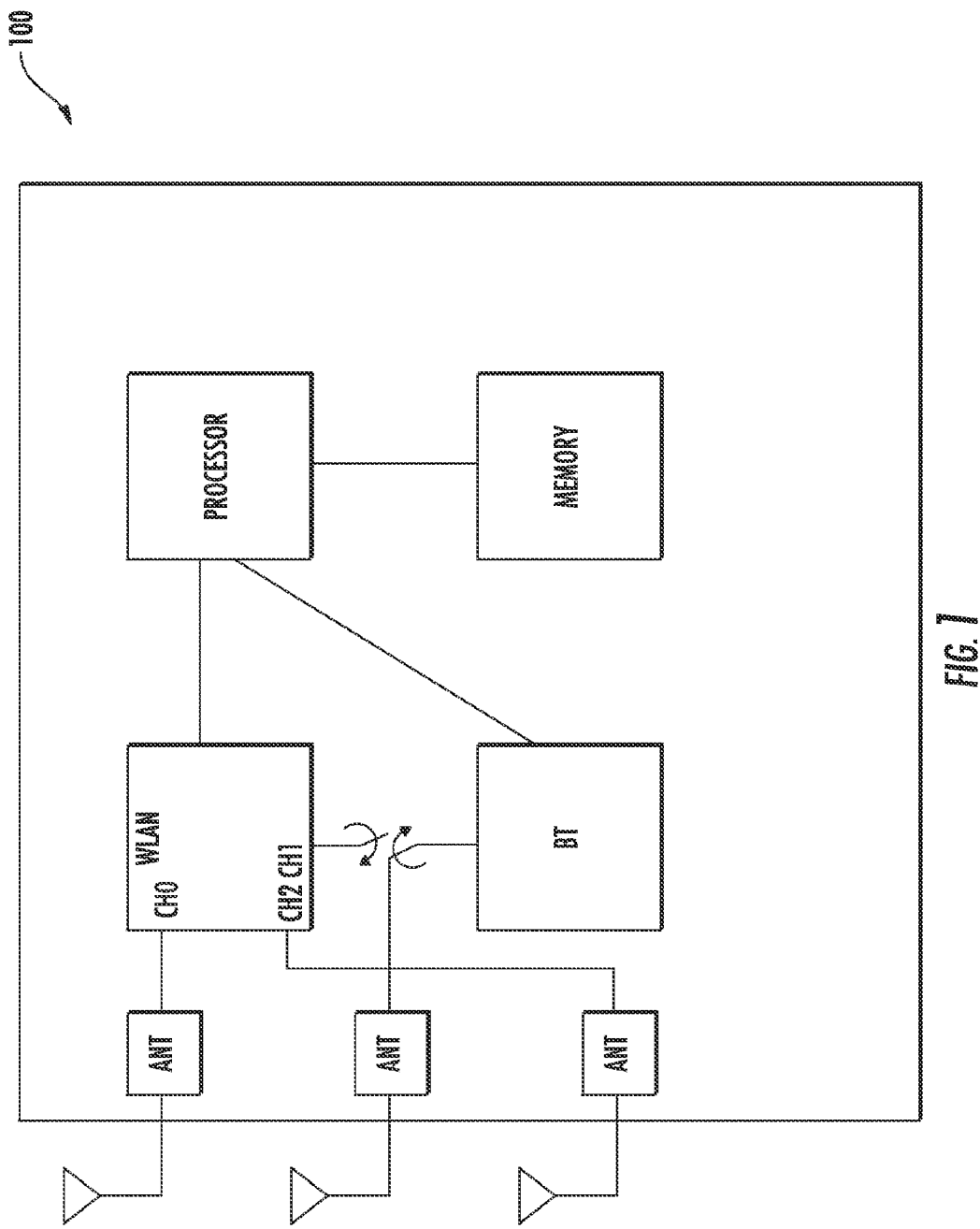
FIG. 1 is a logical block diagram of one exemplary prior art wireless local area network/Bluetooth (WLAN/BT) client device.

All Figures © Copyright 2012-2013 Apple Inc. All rights reserved.

DETAILED DESCRIPTION

Reference is now made to the drawings, wherein like numerals refer to like parts throughout.

Detailed Description of Exemplary Embodiments

Exemplary embodiments are now described in detail. While these embodiments are primarily discussed in the context of a device having both WLAN and Bluetooth wireless interfaces, the general principles and advantages may be extended to other types of wireless devices that experience significant noise due to aggressive form factor design and/or designs that share a crowded transmission medium across multiple radio technologies resulting in reduced data rates, the following therefore being merely exemplary in nature.

For example, those of ordinary skill in the related arts will recognize that various implementations are widely applicable to other wireless technologies, especially those that are typically packaged with other interference-generating components (e.g., digital components such as a central processing unit (CPU), graphics processor (GFX), memory components, hard disk drives (HDD), liquid crystal displays (LCDs), other wireless interfaces, etc.). Such applications include for example, cellular applications, wireless personal media devices, and the like.

Overview

In one aspect, the aforementioned issues are addressed by, inter cilia, coordinated management of tasks on interfaces with overlapping spectral usage as disclosed herein. For example, in one embodiment, interfaces may be used for different tasks (e.g., wireless local area network (WLAN) for data and personal area network (PAN) for human interface devices), and configured to evaluate the priority of the tasks and adjust the operation of one or more of the interfaces. Intelligent prioritization and/or adjustment can mitigate any coexistence problems that may occur.

In various implementations, the one or more coexisting wireless interfaces are configured to negotiate with one another to determine the highest priority wireless interface. For example, the WLAN baseband may coordinate priorities between itself and the PAN baseband via a mutual interface.

In some cases, the negotiation between the interfaces (or management by dedicated logic) is based on task priorities. Certain tasks may be emphasized more than others. In other use cases, priorities may be dynamically altered or reconfigured, such as e.g., determined by a higher level process or application.

In various implementations, the physical isolation characteristics of the antennas of the wireless device are leveraged to optimize the physical design of the device. For example, during initial design analysis, the WLAN/PAN antenna isolation may be measured according to multiple operating mode scenarios; for each of the scenarios, the operational parameters are optimized for each of the modes. In another example, multiple antennas (e.g., an array or group, etc.) are implemented with varying capabilities/performances depending on antenna assignment (e.g. broadcast power, received signal strength, isolation, modulation and coding, multiple-input multiple-output (MIMO) operation, etc.). As described in greater detail herein, intelligent management of antenna resources can be used to maximize coexistence performance (e.g. user experience, throughput, etc.).

Existing Wireless Technology—

New products continue to push the limits of existing IEEE 802.11a/b/g/n and Bluetooth (BT) coexistence. Consider an exemplary mobile device with an IEEE 802.11 Wireless Local Area Network (WLAN) MIMO (multiple input, multiple output) 3×3 interface, and a BT interface, where the WLAN and BT interface share one or more antennas. Unfortunately, when these radios are packed into an aggressive form factor design, the resulting interference cannot meet existing performance requirements.

For example, the exemplary Macbook Pro (manufactured by the Assignee hereof) includes three (3) antennas in a clutch barrel (the hinge portion of the device contains springs that form a clutch mechanism, which is referred to as the so-called "clutch barrel") and a so-called "retina" type display. The relatively small size of the clutch barrel and close proximity to the high-speed display interface greatly impacts antenna isolation. The measured average isolation between antennas is very low and greatly compromises antenna performance. Noticeable impacts of low isolation include, for example, BT mouse (MS) "skipping" and/or "jumpiness", low WLAN throughput and/or data rates, erratic device behaviors, connection loss, etc. Furthermore, recent improvements in BT components have added enhanced transmit modes that can boost transmit power up to 10 dBm. If improperly managed, boosted BT operation can further jam or degrade WLAN operation.

Referring now to FIG. 1, one exemplary WLAN/BT capable client device 100 is illustrated. As shown, one (1) antenna is shared between WLAN and BT via a series of switches (WLAN #2/BT). The other two (2) antennas for WLAN (WLAN #1, WLAN #3) have limited isolation to the shared antenna (WLAN #2/BT). During certain operational modes, the WLAN and BT interfaces "time share" or "time multiplex" the shared antenna. WLAN/BT time sharing algorithms allocate a first portion of time to the BT interface, and a second portion of time to the WLAN interface. While typical BT devices use much lower data rates than the corresponding WLAN interface, the BT interface is typically higher priority, because most BT devices are high-priority user interface type equipment (e.g., BT mouse, BT keyboard, BT headset (e.g., both Synchronous Connection Oriented (SCO) mono and Advanced Audio Distribution Profile (A2DP) stereo implementations), etc.) which can directly impact user experience. In fact, if the system of FIG. 1 is connected to several BT devices, then WLAN transmit and receive performance is significantly impacted due to such BT prioritization. In some cases, when WLAN data rates drop below a certain level (e.g., lower than 10 Mbps), many desirable applications can no longer be supported (e.g., High Definition (HD) video streaming, FacenTime™, etc.).

As a brief aside, within the exemplary context of IEEE 802.11n wireless networks, a predefined set of Modulation and Coding Schemes (MCS) are recognized by IEEE 802.11n-compliant devices; each MCS is uniquely identified by an index value. During operation, a transmitter determines an appropriate MCS and transmits the corresponding index value to the receiver. Responsively, the receiver configures itself according to the index value. TABLE 1 below details extant Modulation and Coding Schemes (MCS) implemented within IEEE 802.11n compliant devices as of the present date.

TABLE 1

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | ½ | 6.50 | 7.20 | 13.50 | 15.00 |
| 1 | 1 | QPSK | ½ | 13.00 | 14.40 | 27.00 | 30.00 |
| 2 | 1 | QPSK | ¾ | 19.50 | 21.70 | 40.50 | 45.00 |
| 3 | 1 | 16-QAM | ½ | 26.00 | 28.90 | 54.00 | 60.00 |
| 4 | 1 | 16-QAM | ¾ | 39.00 | 43.30 | 81.00 | 90.00 |
| 5 | 1 | 64-QAM | ⅔ | 52.00 | 57.80 | 108.00 | 120.00 |
| 6 | 1 | 64-QAM | ¾ | 58.50 | 65.00 | 121.50 | 135.00 |
| 7 | 1 | 64-QAM | ⅚ | 65.00 | 72.20 | 135.00 | 150.00 |
| 8 | 2 | BPSK | ½ | 13.00 | 14.40 | 27.00 | 30.00 |
| 9 | 2 | QPSK | ½ | 26.00 | 28.90 | 54.00 | 60.00 |
| 10 | 2 | QPSK | ¾ | 39.00 | 43.30 | 81.00 | 90.00 |
| 11 | 2 | 16-QAM | ½ | 52.00 | 57.80 | 108.00 | 120.00 |
| 12 | 2 | 16-QAM | ¾ | 78.00 | 86.70 | 162.00 | 180.00 |
| 13 | 2 | 64-QAM | ⅔ | 104.00 | 115.60 | 216.00 | 240.00 |
| 14 | 2 | 64-QAM | ¾ | 117.00 | 130.00 | 243.00 | 270.00 |
| 15 | 2 | 64-QAM | ⅚ | 130.00 | 144.40 | 270.00 | 300.00 |
| 16 | 3 | BPSK | ½ | 19.50 | 21.70 | 40.50 | 45.00 |
| 17 | 3 | QPSK | ½ | 39.00 | 43.30 | 81.00 | 90.00 |
| 18 | 3 | QPSK | ¾ | 58.50 | 65.00 | 121.50 | 135.00 |
| 19 | 3 | 16-QAM | ½ | 78.00 | 86.70 | 162.00 | 180.00 |
| 20 | 3 | 16-QAM | ¾ | 117.00 | 130.70 | 243.00 | 270.00 |
| 21 | 3 | 64-QAM | ⅔ | 156.00 | 173.30 | 324.00 | 360.00 |
| 22 | 3 | 64-QAM | ¾ | 175.50 | 195.00 | 364.50 | 405.00 |
| 23 | 3 | 64-QAM | ⅚ | 195.00 | 216.70 | 405.00 | 450.00 |
| 24 | 4 | BPSK | ½ | 26.00 | 28.80 | 54.00 | 60.00 |
| 25 | 4 | QPSK | ½ | 52.00 | 57.60 | 108.00 | 120.00 |
| 26 | 4 | QPSK | ¾ | 78.00 | 86.80 | 162.00 | 180.00 |
| 27 | 4 | 16-QAM | ½ | 104.00 | 115.60 | 216.00 | 240.00 |
| 28 | 4 | 16-QAM | ¾ | 156.00 | 173.20 | 324.00 | 360.00 |
| 29 | 4 | 64-QAM | ⅔ | 208.00 | 231.20 | 432.00 | 480.00 |
| 30 | 4 | 64-QAM | ¾ | 234.00 | 260.00 | 486.00 | 540.00 |
| 31 | 4 | 64-QAM | ⅚ | 260.00 | 288.80 | 540.00 | 600.00 |

For a 3×3 MIMO client, only MCSO through MCS23 are available (i.e., each antenna can handle a spatial stream, so a 3×3 MIMO system can handle three (3) spatial streams). During intervals of relatively high RSSI (e.g., presumably when the client device and the WLAN AP are very close in spatial proximity), prior art IEEE 802.11n transmitters will increase the MCS complexity to take advantage of the clear channel conditions (e.g., the WLAN AP allocates a 3×3 MCS (e.g., MCS 21, 22, and 23 utilize 64-QAM which requires a relatively high SNR)). Similarly, when channel quality has significantly degraded, the IEEE 802.11n transmitter switches down to lower, more robust MCS configurations.

Figure 2:
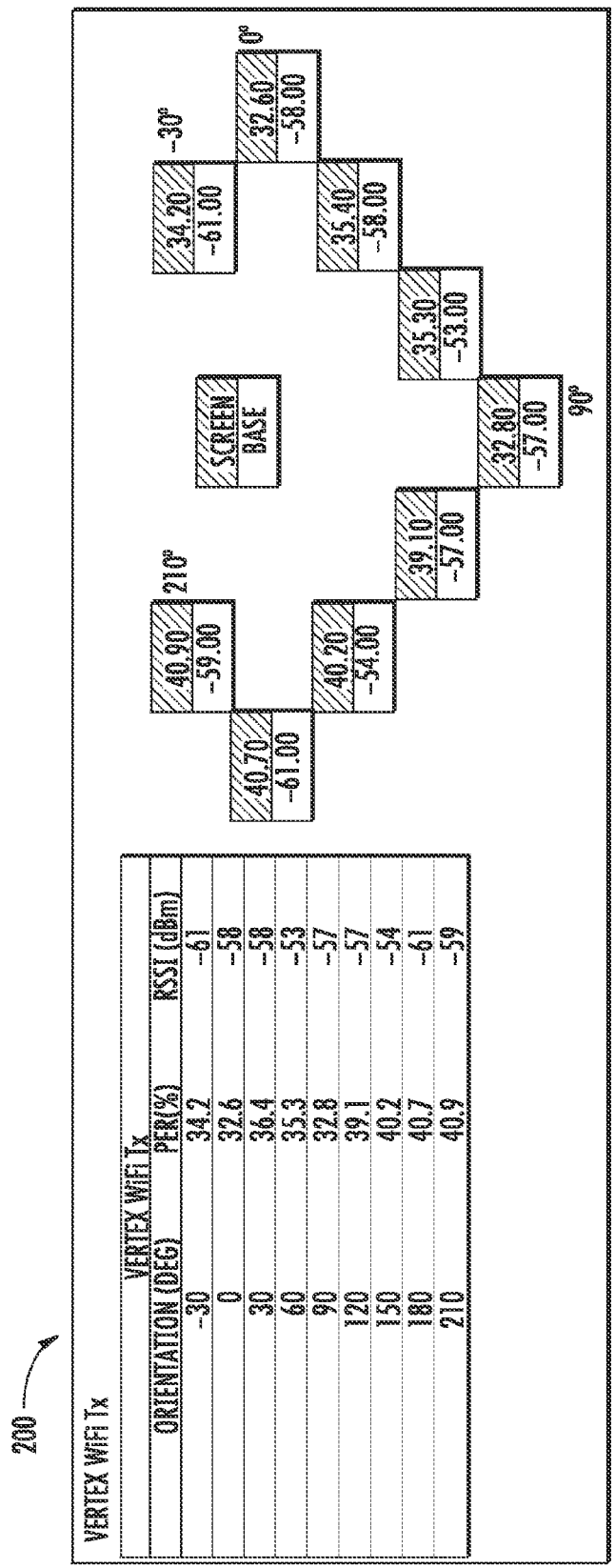
FIG. 2 is a graphical representation of experimentally determined performance metrics for the exemplary prior art WLAN/BT client device of FIG. 1.

FIG. 2 is a graphical representation 200 of experimentally determined performance metrics for the exemplary WLAN/BT capable client device 100 of FIG. 1 with a hybrid time sharing interference mitigation scheme. In this scenario, the client device (Macbook Pro® (MBP)) has turned on its WLAN transmitter (e.g., Channel 6) while a BT mouse is placed approximately thirty (30) centimeters (cm) away (a typical use case distance) and rotated around the client device from −30 degrees to 210 degrees, with measurements performed at 30 degree increments. Illustrative values for RSSI (receiver signal strength index) and packet error rate (PER) are shown for clarity, although it is readily appreciated by those of ordinary skill that actual measured values will vary widely based on e.g., component tolerances, radio conditions, etc. Within this context, it is of particular note that while the WLAN transmitter is active the BT mouse will experience PER that exceeds 30%; this relatively high PER results in "jerky" mouse operation, which is undesirable from a consumer standpoint.

Figure 3:
FIG. 3 is a table of prior art WLAN/BT client device (of FIG. 1) performance for a set of common user tasks during concurrent operation of both WLAN and BT interfaces.

FIG. 3 presents a summary 300 of client device performance for a set of common user tasks during concurrent operation of both WLAN and BT interfaces. Many of the target usage scenarios show some degree of perceptible impairment, and certain use cases fail altogether.

Figure 4:
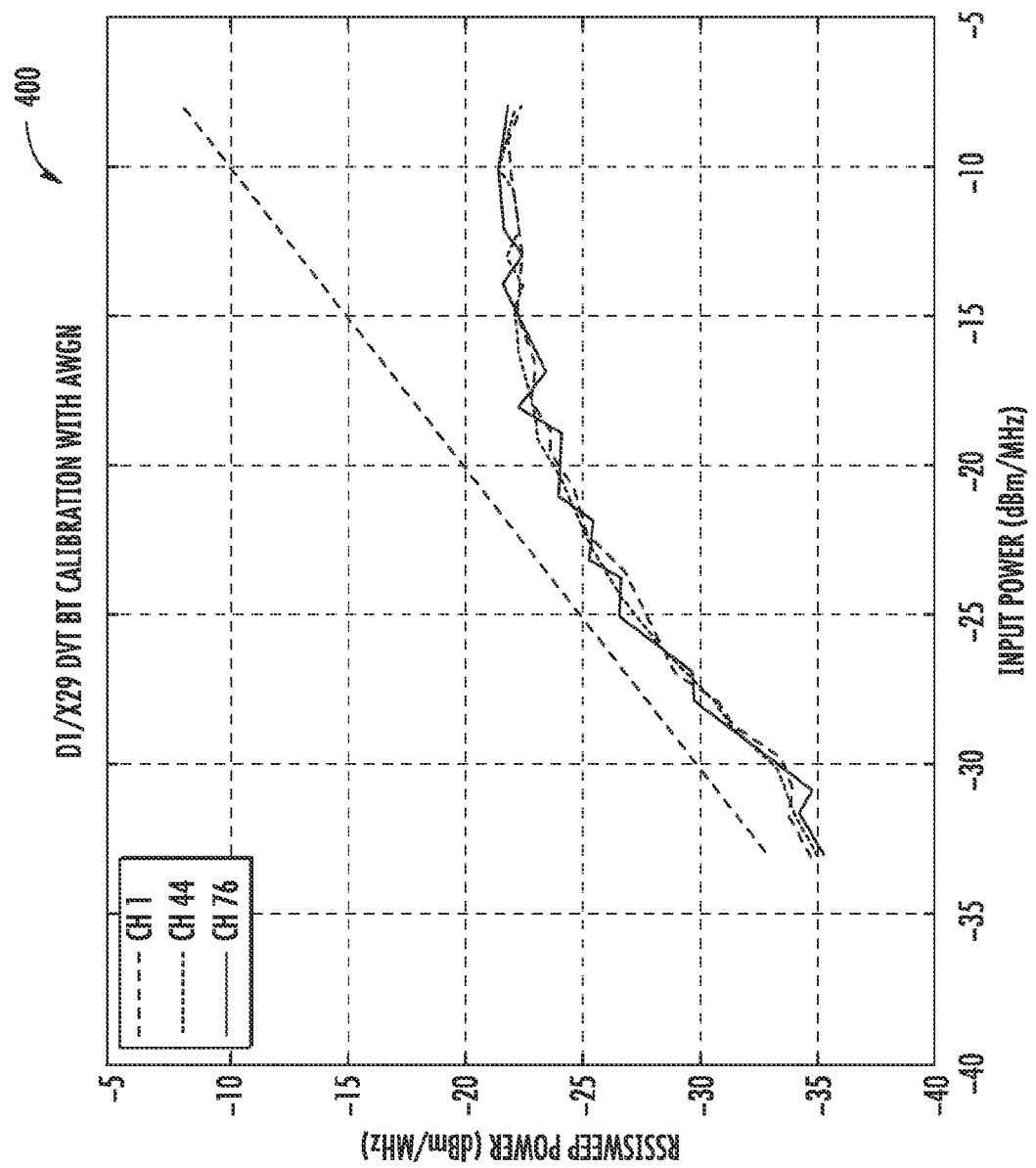
FIG. 4 is a graphical representation of the performance of the BT radio of the prior art client device of FIG. 1 into a saturation region.

Furthermore, FIG. 4 is a graphical illustration 400 of some fundamental issues with poor isolation. As shown, the graph presents the input power to the BT radio and the resulting received signal strength (RSS) as measured at the BT radio. As shown, the graph "levels out", due to saturation of the radio components.

Within this context, assuming that the WLAN and BT radios have approximately 15 dB of isolation, if the WLAN radio transmits at an integrated power of 18 dBm/20 MHz this translates to approximately 13 dB of noise for the BT radio. Specifically, BT uses a 1 MHz bandwidth which corresponds to $1/20^{th}$ of the WLAN bandwidth. This results in a loss factor of 20 which is equivalent to a −13 dB attenuation. Consequently, the BT radio only receives a maximum power of 5 dBm/MHz (18 dBm/20 MHz−13 dB=5 dBm/MHz); with only a 15 dB isolation, the BT radio will receive approximately −10 dBm (5 dBm/MHz−dB=−10 dBm). This receive power will saturate the BT radio. Similarly, if the BT radio transmits at 10 dBm/MHz, then with 15 dB isolation, the WLAN radio will receive approximately −5 dBm (10 dBin/MHz−15 dB=−5 dBm).

In view of the foregoing complications, improved methods and apparatus for mitigating interference between multiple radio interfaces are needed. Ideally, such improved methods and apparatus should reduce both in-band noise and out of band noise within very aggressive form factors. In particular, these solutions should handle scenarios with low or limited radio isolation characterized by: blocking/compression of RF signaling, undesirable inter-modulation (IM) products, increased noise floors, distortions/non-linearities, etc. Still further, such solutions may further reduce unexpected interferences such as e.g., improperly designed filters, out of tolerance components, etc.

Exemplary Apparatus—

Various embodiments are now described in greater detail. In one embodiment, the wireless device includes at least a first radio and a second radio, where the first and second radios interfere to at least some degree with one another. In one implementation, the first radio includes Wireless Local Area Network (WLAN) interface such as IEEE 802.11-compliant Iii-Fi, and the second radio includes a Personal Area Network (PAN) such as e.g., Bluetooth.

Exemplary Hardware Apparatus—

Figure 5:
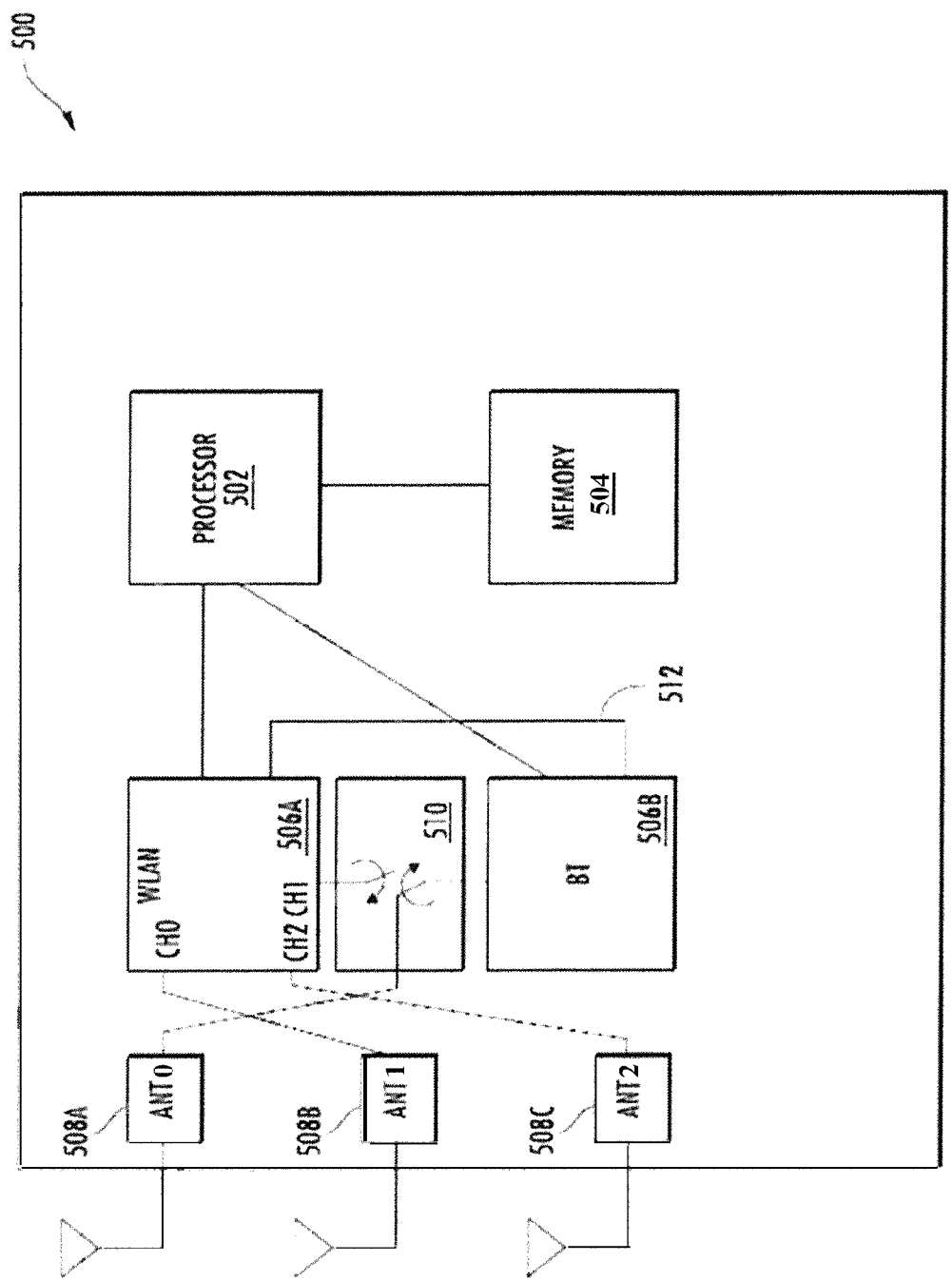
FIG. 5 is a logical block diagram of one exemplary client device, in accordance with various embodiments.

Referring now to FIG. 5, one logical block representation of the wireless device 500 configured to mitigate interference between multiple radio interfaces in aggressive form factor designs is presented. As used herein, the term "wireless device" includes, but is not limited to cellular telephones, smart phones (such as for example an iPhone™ manufactured by the Assignee hereof), handheld computers, tablet devices, personal media devices (PMDs), or any combinations of the foregoing. While a specific device configuration and layout is shown and discussed, it is recognized that many other implementations may be readily implemented by one of ordinary skill given the present disclosure, the wireless device 500 of FIG. 5 being merely illustrative of the broader principles disclosed herein.

The processing subsystem 502 includes one or more of central processing units (CPU) or digital processors, such as a microprocessor, digital signal processor, field-programmable gate array, RISC core, a baseband processor, or plurality of processing components mounted on one or more substrates. In some embodiments, one or more of the above-mentioned processors (e.g. the baseband processor) are further configured to execute one or more processor instructions stored on a non-transitory computer-readable storage media 504.

As shown, the processing subsystem is coupled to non-transitory computer-readable storage media such as memory 504, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown processing subsystem 502 includes discrete components; however, it is understood that in some embodiments they may be consolidated or fashioned in a SoC (system-on-chip) configuration.

The wireless device 500 further includes one or more wireless interfaces 506 as discussed above. For example, in one exemplary implementation, the wireless device includes a WLAN baseband modem 506A (compliant with IEEE 802.11 wireless standards, e.g., Wi-Fi) and a Bluetooth (BT) baseband modem 506B. In the illustrated device 500, the WLAN interface (CH0, CH1, CH2) has two (2) antennas 508B (ANT1), 508C (ANT2) and shares an antenna 508A (ANT0) with the BT interface via a switch element 510. During certain operational modes, the WLAN and BT interfaces "time share" the shared antenna. Specifically, WLAN/BT time sharing algorithms allocate a first portion of time to the BT interface, and a second portion of time to the WLAN interface.

In one salient embodiment, the one or more wireless interfaces are configured to negotiate with one another to determine the highest priority wireless interface. In one configuration, the WLAN baseband 506A coordinates priorities between itself and the BT baseband 506B via a bus interface 512. Common examples of a bus interface include for example: address and data busses, serial interfaces, parallel interfaces, etc. Specifically, in one exemplary variant, the bus interface enables a data transfer protocols between the WLAN baseband and the BT baseband.

The WLAN baseband 506A can also be configured to allocate or grant one or more resources for the BT traffic based on priority information. In some variants, the WLAN baseband may poll or query the BT baseband to determine the BT traffic priority information. In alternate embodiments, the BT baseband may request one or more resources to support BT traffic. As used herein, the term "resources" refers generally and without limitation physical or logical elements which are useful for supporting wireless operation and which are limited in availability. Common examples of resources include e.g., antennas, time slots, spectral resources, orthogonal spreading codes, time-frequency resources, etc.

Once the WLAN baseband has determined the BT traffic priority information, the WLAN baseband assigns a priority to each portion of WLAN traffic and BT traffic. In one embodiment, priorities are assigned based on data type. For example, in one such scheme, priorities are assigned to each of WLAN/BT scanning procedures, control flow packets (such as acknowledgments (ACK), etc.), BT human interface devices (HID) (such as mouse, keyboard, touchpad, etc.), audio data, and WLAN and BT data packets. Based on the relative priority of the traffic type, the WLAN baseband assigns resources accordingly. For example, the WLAN baseband identifies that BT traffic is of a higher priority than the WLAN traffic; accordingly, the WLAN baseband dedicates the BT traffic to the shared antenna, and scales its own traffic for the remaining two (2) antennas. Once the BT traffic priority has dropped, the WLAN baseband can switch the shared antenna back to a time shared hybrid mode.

It will be appreciated that while an exemplary implementation of the device 500 utilizes a static or predetermined prioritization scheme in the foregoing scheme (e.g., mouse use is prioritized over WLAN use), in other implementations the priorities may be dynamically altered or reconfigured. For instance, in some embodiments the prioritization scheme may be determined by a higher level process or software application (e.g., running on the device processor) which evaluates the current operational environment/status of the device 500 and makes a prioritization based thereon, according to e.g., user input, preferences, context (e.g., "work" versus "personal" use), an external entity requirements (e.g., a Wi-Fi AP or BT master device to which the BT interface of the device 500 is slaved), etc.

In various implementations, the physical isolation characteristics of the antennas of the wireless device are leveraged to optimize the physical design of the device. Specifically, during initial design analysis, the WLAN/BT antenna isolation is measured in both in a so-called "open mode" (i.e., where the lid has been opened for use as in e.g., a laptop) and a so-called "clamshell mode" (i.e., where the lid is closed, but one or more wireless interfaces are still active). In one exemplary embodiment, the WLAN baseband 506A and BT baseband 506B are connected to antennas 508A, 508B, and 508C. While the WLAN baseband is connected to all three (3) antennas the BT baseband experiences different degrees of performance based on which antenna it is connected to, thus by intelligently selecting the appropriate antenna, BT performance can be improved significantly.

Figure 6:
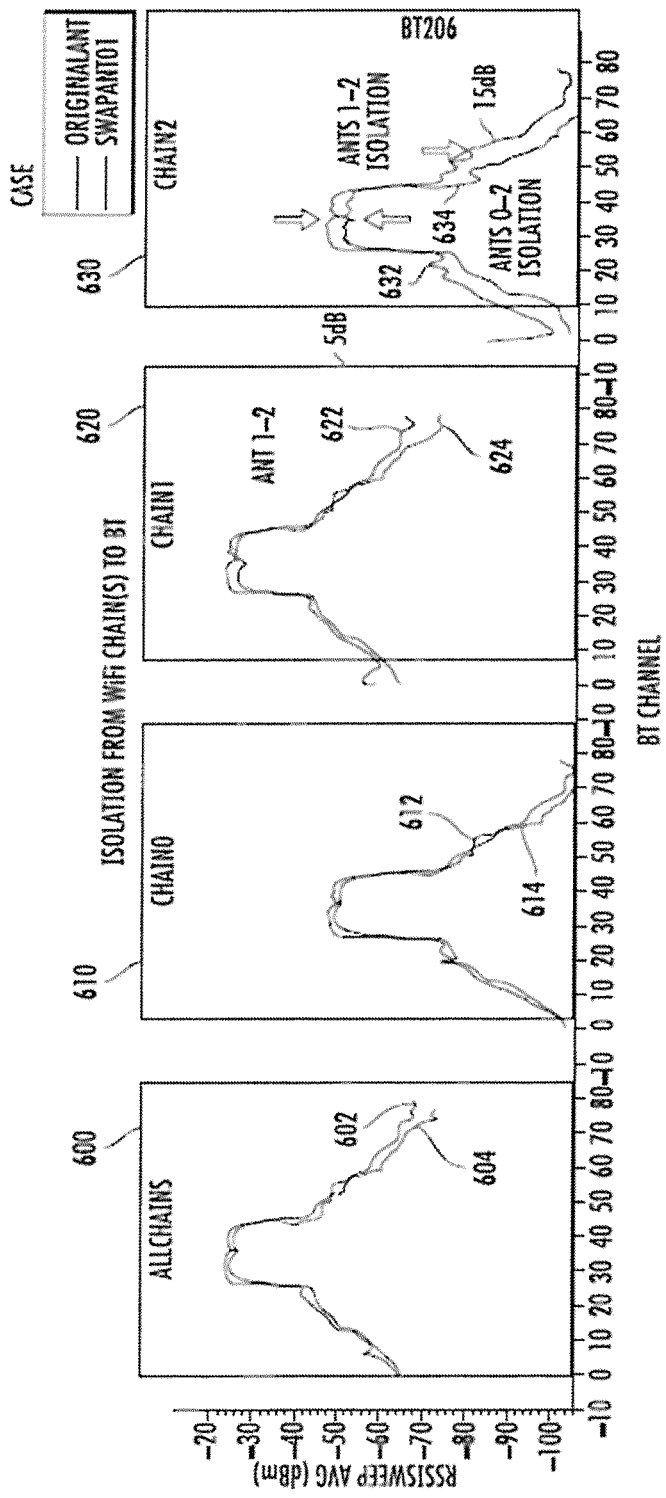
FIG. 6 is a graphical representation of a comparison of antenna isolation between the device of FIG. 5 and the prior art device of FIG. 1.

Referring now to FIG. 6, performance measurements for the BT baseband according to the exemplary prior art device 100 (FIG. 1) compared to the exemplary device 500 (FIG. 5) are shown. The BT RSST is measured according to a so-called "sweep" from Channel 0 to 78. During the sweep measurement, the WLAN is configured to transmit via one or more of its transmit chains (CH0, CH1, CH2) with its highest transmit power at a fixed frequency (e.g., Channel 6) over one or more of the antennas 508A, 508B, and 508C, while the BT baseband measures the noise floor (NF).

A first performance chart illustrates the overall isolation (WLAN transmitting on all chains over all antennas) 600 as determined by the BT baseband on antenna 508B (602), compared to the BT baseband connected to antenna 508A (604).

A second performance chart 610 illustrates the comparison for isolation between WLAN transmitting on CH0 over antenna 508B versus BT on antenna 508B (612) and BT on antenna 508A (614).

A third performance chart 620 illustrates the comparison for isolation between WLAN transmitting on CH1 over antenna 508A versus BT on antenna 508B (622) and BT on antenna 508A (624) (as shown the isolation is dominated by the RF switch isolation.

A fourth performance chart 630 illustrates the comparison for isolation between WLAN transmitting on CH2 over antenna 508C versus BT on antenna 508B (622) and BT on antenna 508A (624).

Techniques and architectures for mitigating mutual interference for such co-located wireless transmitters are presented in co-owned and co-pending U.S. patent application Ser. No. 13/025,059 filed Feb. 10, 2011 and entitled "METHODS AND APPARATUS FOR WIRELESS COEXISTENCE BASED ON TRANSCEIVER CHAIN EMPHASIS", previously incorporated herein by reference in its entirety. As discussed therein, methods and apparatus for mitigating the effects of radio frequency (RF) interference between co-located or proximate wireless devices in a client or user device such as a mobile computer or smartphone as disclosed. In one exemplary embodiment, the methods and apparatus dynamically mitigate the interference between co-located WLAN/PAN air interfaces disposed within a physically constrained device by adjusting one or more parameters specific to each transmit "chain". For example, each transmit chain of the WLAN can be calibrated to a specific transmit power, where the calibrated transmit power is configured to minimize interference with the nearby but unrelated PAN.

Exemplary Software—

Referring back to FIG. 5, in one embodiment, the non-transitory computer-readable storage media 504 further includes instructions that can be executed by at least one of the processing subsystem 502, the WLAN baseband processor 506A and/or the BT baseband processor 506B.

In various implementations, one or more instructions of the non-transitory computer-readable storage media are configured to control at least one of WLAN and BT transmit power. In one exemplary embodiment, the WLAN processor can adjust one or more WLAN transmit powers according to a so-called "tuple" such as a triplet (e.g., [−x dBm, −y dBm, −z dBm], where the elements of the triplet correspond to the antennas 508A, 508B, 508C). In one such variant, the WLAN baseband can additionally instruct the BT baseband to boost transmit power to e.g., prioritize BT traffic, improve BT performance, etc. Responsively, the BT baseband increases its corresponding transmit power from e.g., 0 dBm to 10 dBm when so instructed.

For example, consider a WLAN baseband processor which is configured to adjust at least one of WLAN and BT transmit power according to negotiated priorities. As previously alluded to, the WLAN baseband 506A can coordinate priorities between itself and the BT baseband 506B via the bus interface 512. Based on the relative priority of the traffic, the WLAN baseband can assign and/or determine an appropriate transmit power. For example, when the WLAN baseband identifies that BT traffic is of a higher priority than the WLAN traffic, the WLAN baseband instructs the BT baseband to boost its (the BT transmitter's) transmit power limit to 10 dBm. Once the BT traffic priority has dropped, the BT baseband can revert back to the lower transmit power limit (e.g., 0 dBm). In some variants, the WLAN baseband processor provides one or more instructions to the BT baseband over the bus interface 512.

In various implementations, one or more instructions of the non-transitory computer-readable storage media are configured to limit certain transaction to particular resources. For example, in one such embodiment, the WLAN processor can allocate a particular antenna for a specified task and/or message; e.g., the WLAN baseband can dedicate an antenna for only transmitting high priority signals (such as e.g., control flow messages). As a brief aside, control flow messages (such as resource grants, resource allocations, acknowledgements, non-acknowledgements, etc.) may be prioritized over normal data traffic, because control flow messages significantly affect network operation for the device, the network, and other neighboring devices. By reserving a single input single output (SISO) antenna configuration for transmitting e.g., ACK signaling (on the antenna with the best antenna isolation), the WLAN baseband is improving the likelihood of a successful ACK transmission.

In a related embodiment, the WLAN baseband can (based on e.g., a certain amount of BT bandwidth, BT priority, etc.) direct the switching element 510 to couple either the BT baseband or the WLAN baseband to the shared antenna 508C. For example, consider a scenario where the BT baseband has a large amount of high priority traffic; the WLAN baseband can switch the shared antenna wholly to BT traffic. After the BT traffic, the WLAN baseband can reconfigure the switching element so as to support the time-shared hybrid mode (which may incorporate various "fairness" or other allocation protocols).

Moreover, it should further be appreciated that in certain scenarios, the WLAN baseband will actually perform better on the remaining two (2) antennas when compared to time sharing the third antenna. For example, as disclosed within U.S. patent application Ser. No. 13/312,894 filed Dec. 6, 2011 and entitled "METHODS AND APPARATUS FOR WIRELESS OPTIMIZATION BASED ON PLATFORM CONFIGURATION AND USE CASES", (previously incorporated by reference in its entirety), the wireless device can provide the wireless network with an indications of impacted operations based on the device's platform configuration. In this example, the WLAN network server (Access Point (AP)) can adjust the radio link WLAN device for fewer available antennas, rather than assigning a higher order modulation and coding scheme (MCS) scheme that the device cannot support (resulting in high failure rates).

In still another embodiment, the WLAN baseband can (based on e.g., a certain amount of BT bandwidth, BT priority, etc.) provide farther limitations to the BT baseband operations. In one such exemplary embodiment, the WLAN baseband can instruct the BT baseband to limit automatic frequency hopping procedures (AFH) under certain conditions. Unfortunately, when the WLAN baseband is transmitting at 2.4 GHz, the BT baseband cannot detect the resulting interference in real time. Consequently, the WLAN baseband identifies one or more channels which will be will be heavily impacted by WLAN activity, and provides this information to the BT baseband; responsively, the BT baseband can significantly improve AFH performance by avoiding the impacted channels. For example, when WLAN is transmitting in Channel 6, the WLAN baseband will instruct the BT baseband to avoid operation in its 22 MHz main lobe and 18 MHz side lobes. The BT baseband will consider avoiding these portions by e.g., performing AFH in the remaining thirty (30) channels.

Exemplary Wireless Interfaces—

Referring back to FIG. 5, in one implementation, the wireless interfaces 506 are further configured to adjust component operation so as to prevent saturation effects.

As a brief aside, the exemplary wireless interfaces include various analog and feedback elements. Common examples of such components include for example: automatic gain control (AGC), low noise amplifiers (LNA), automatic frequency control (AFC), analog to digital converters (A/D), digital to analog converters (D/A), etc. Generally, these components are handled within discrete logic, and may be grossly controlled by the processor (if at all).

In one exemplary embodiment, the WLAN baseband is configured to turn on or off one or more components, depending on a degree of interference. For example, in one variant, the antenna includes a first LNA and a second LNA (external LNA (eLNA)). Depending on the strength of interference, the WLAN baseband can disable the eLNA. Specifically, when the received signal strength (RSS) exceeds a maximum threshold, the received signal will saturate the A/D of the receiver. By disabling the eLNA, the received signal can be reproduced with better linearity, resulting in increased overall performance.

In one variant, the enabling and/or disabling of the eLNA is dynamically controlled such that the eLNA is only disabled when the RSS is sufficiently high. This ensures that the WLAN range is likely unaffected. Furthermore, those of ordinary skill in the related arts will recognize that embodiments which have a larger number of LNAs can progressively enable or disable LNAs, based on the overall RSS. Still further, since LNAs provide various gain characteristics, in certain circumstances LNAs may be selected intelligently for enabling/disabling based on characteristics such as e.g., linearity, amount of gain, added noise figure, etc.

In a further embodiment, the WLAN baseband is configured to re-tune various radio frequency (RF) components such that they are more resilient to interference. Re-tuning may result in an increase to channel-to-channel variability over the entire spectral range; therefore, in some cases certain performance tradeoffs may be necessary so as to preserve e.g., performance, reliability, responsiveness, etc. For example, one common instance of re-tuning may include e.g., changing one or more filter characteristics. Filter characteristics can be adjusted to accentuate frequencies of interest, and/or attenuate frequencies of interferers.

In still other embodiments, the WLAN baseband may instruct the BT baseband to de-sense the BT components to prevent saturation by e.g., disabling LNAs, adjusting RF components, etc. In alternate embodiments, the BT baseband may handle de-sense operations distinctly or independently, or based on certain system inputs received from the WLAN baseband.

Figure 7:
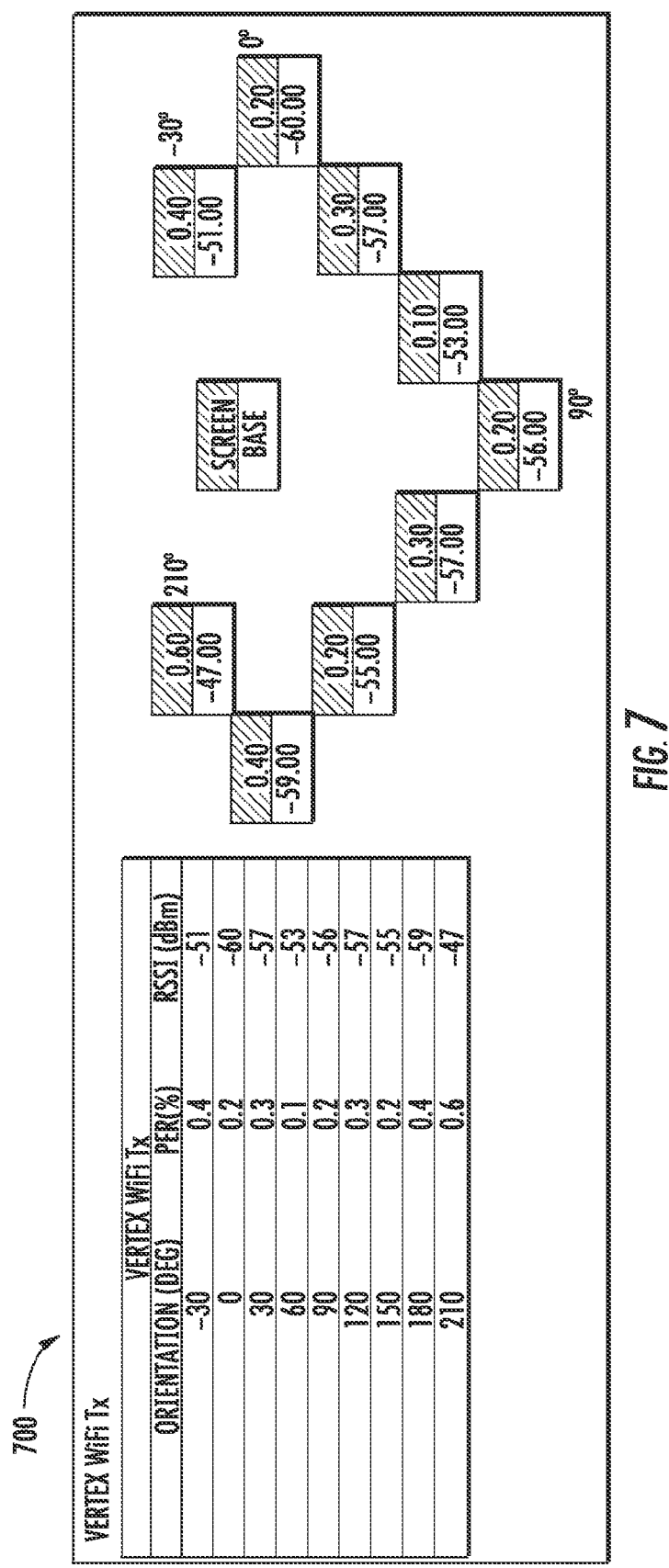
FIG. 7 is a graphical representation of experimentally determined performance metrics for the exemplary WLAN/BT client device of FIG. 5.

FIG. 7 is a graphical representation 700 of experimentally determined performance metrics for the exemplary WLAN/BT capable client device 500 according to various implementations. In this scenario, the client device (Macbook Pro (MBP)) has turned on its WLAN transmitter (e.g., Channel 6) while a BT mouse is placed approximately thirty (30) centimeters (cm) away (a typical use case distance) and rotated around the client device from −30 degrees to 210 degrees, with measurements performed at 30 degree increments. Illustrative values for RSSI (receiver signal strength index) and packet error rate (PER) are shown for clarity, although it is readily appreciated by those of ordinary skill that actual measured values will vary widely based on e.g., component tolerances, radio conditions, etc. When contrasted to the results of FIG. 2, it is readily apparent that performance of the client device 500 have improved significantly.

FIG. 8 presents a summary 800 of the exemplary client device's 500 performance for a set of common user tasks during concurrent operation of both WLAN and BT interfaces. As illustrated, significant improvements in overall use scenario operation should be apparent (especially when viewed in comparison to the results of FIG. 3).

It will be recognized that while certain embodiments are described in terms of a specific sequence of steps of a method, these descriptions are only illustrative of the broader methods in the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within disclosure and claims herein.

While the above detailed description has shown, described, and pointed out novel features as applied to various embodiments, it will be understood that various omissions, substitutions, and changes in the form and details of the device or process illustrated may be made by those skilled in the art without departing from the disclosure. The foregoing description is of the best mode presently contemplated of carrying out the principles disclosed herein. This description is in no way meant to be limiting, but rather should be taken as illustrative of the general principles of the disclosure. The scope should be determined with reference to the claims.

What is claimed is:

1. A wireless enabled user device comprising:
   a first wireless interface comprising at least a time shared antenna with a second wireless interface, the first wireless interface operative in a first frequency band;
   the second wireless interface disposed proximate the first wireless interface within the wireless enabled user device and operative in a substantially overlapping frequency band with the first frequency band, the second wireless interface comprising a plurality of antennas; and logic in communication with at least one of the first and second wireless interfaces, the logic configured to:
- determine at least one priority of concurrent first and second tasks to be performed by the first and second wireless interfaces, respectively;
- adjust operation of the time shared antenna based on the at least one determined priority so as to achieve at least one of: (i) mitigated radio interference; and/or (ii) enhanced data throughput;
- allocate one or more tasks of the second wireless interface to be handled by particular ones of the plurality of antennas based at least in part on the adjusted operation; and
- assign the first wireless interface to operate at a particular channel on the time shared antenna when the second wireless interface is operating at a particular frequency on at least one of the plurality of antennas.

2. The user device of claim 1, wherein the adjustment of the operation is based at least in part on a first priority associated with the first wireless interface.

3. The user device of claim 1, wherein the adjustment of the operation comprises a first assignment of a first one of the plurality of antennas of the first interface for completion of the first task.

4. The user device of claim 1, wherein the adjustment of the operation comprises a delay in completion of the first task.

5. The user device of claim 1, wherein the determined at least one priority is based on a static priority scheme.

6. The user device of claim 1, wherein the determined at least one priority is based at least in part on user input.

7. The user device of claim 1, wherein the determined at least one priority comprises a first priority level associated with the first task and a second priority level associated with the second task.

8. The user device of claim 2, wherein the first priority associated with the first wireless interface is determined in response to a query from the first wireless interface.

9. The user device of claim 3, wherein the adjustment of the operation further comprises a second assignment of the time shared antenna to the second wireless interface for completion of the second task, where the first one of the plurality of antennas and the time shared antenna have a known isolation.

10. The user device of claim 7, further comprising logic configured to reserve at least one antenna for the first task assigned to the first priority level.

11. The user device of claim 7, wherein the first priority level is associated with human interface device (HID) operation and the second priority level is associated with Internet Protocol (IP) activity, the first priority level being greater than the second priority level.

12. A wireless interface comprising:
- a transmission device comprising a plurality of antennas; and
- processing logic in operative communication with the transmission device, the processing logic configured to run one or more computer programs thereon, the one or more computer programs comprising a plurality of instructions configured to, when executed, cause the wireless interface to:
  - query priority logic, the priority logic configured to select a priority scheme associated with execution of one or more tasks by the wireless interface, the selected priority scheme configured to allocate a particular one or more of the plurality of antennas of the wireless interface to handle specified tasks, where unspecified tasks are allocated to remaining ones of the plurality of antennas; and
  - based at least in part on the selected priority scheme, adjust one or more operational parameters used in the execution of the one or more tasks;
- wherein the priority scheme is selected to optimize data throughput of the wireless interface and at least one other wireless interface with overlapping spectral usage.

13. The wireless interface of claim 12, wherein the adjustment of the one or more operational parameters comprises adjustment of a transmit power of the transmission device.

14. The wireless interface of claim 12, wherein:
- the transmission device comprises a plurality of components; and
- the adjustment of the one or more operational parameters comprises deactivation of at least one of the plurality of components during execution of the one or more tasks.

15. The wireless interface of claim 13, wherein the plurality of antennas comprise a multiple-input multiple-output (MIMO) antenna array, and the adjustment of the transmit power is based on a tuple of the MIMO antenna array.

16. A method of managing interference during operation of at least two wireless interfaces with overlapping spectral usage, the method comprising:
- determining a plurality of priorities corresponding to a plurality of tasks that are scheduled to be simultaneously executed, the plurality of tasks being associated with respective ones of the at least two wireless interfaces; and
- based on the determined plurality of priorities, altering the execution of at least one of the plurality of tasks by at least assigning particular ones of a plurality of antennas of one of the at least two wireless interfaces to handle tasks associated with particular ones of the determined plurality of priorities;
- wherein the altered execution reduces a resource interference for the at least two wireless interfaces with overlapping spectral usage;
- wherein the act of determination further comprises determining physical isolation characteristics of the plurality of antennas in both an open mode and a closed mode; and
- wherein when in the closed mode one of the at least two wireless interfaces is still active.

17. The method of claim 16, wherein the determining of at least a first priority comprises polling a baseband processor for the priority.

18. The method of claim 16, wherein the altered execution comprises adjusting a transmit power associated with the at least one of the plurality of tasks.

* * * * *